United States Patent [19]

Gianzero et al.

[11] Patent Number: 5,191,290
[45] Date of Patent: Mar. 2, 1993

[54] LOGGING APPARATUS FOR MEASUREMENT OF EARTH FORMATION RESISTIVITY

[75] Inventors: Stanley C. Gianzero; Roland E. Chemali, both of Austin, Tex.

[73] Assignee: Halliburton Logging Services, Inc., Houston, Tex.

[21] Appl. No.: 604,302

[22] Filed: Oct. 29, 1990

Related U.S. Application Data

[63] Continuation of Ser. No. 176,085, Apr. 1, 1988, abandoned.

[51] Int. Cl.$^5$ .................. G01V 3/02; G01V 3/06; G01V 3/18
[52] U.S. Cl. ................................................. 324/374
[58] Field of Search ........................ 324/367, 374, 355

[56] References Cited

U.S. PATENT DOCUMENTS

| | | | |
|---|---|---|---|
| 2,400,678 | 5/1946 | Archie | 324/347 |
| 2,945,175 | 7/1960 | Egan | 324/367 |
| 3,105,191 | 9/1963 | Schopper | 324/374 |
| 3,167,707 | 11/1965 | Oliver | 324/367 |
| 3,379,964 | 4/1968 | Segesman | 324/374 |
| 3,462,678 | 8/1969 | Eaton | 324/367 |
| 4,468,623 | 8/1984 | Gianzero et al. | 324/367 |
| 4,594,552 | 6/1986 | Grimaldi et al. | 324/374 |

Primary Examiner—Walter E. Snow
Attorney, Agent, or Firm—William J. Beard

[57] ABSTRACT

A logging apparatus for measurement of earth formation resistivity is disclosed. The apparatus includes an elongated sonde having an insulated section and an electrically isolated conductive pad mounted for lateral extension into contact with a borehole wall. The electrically isolated conductive pad includes a plurality of current electrodes disposed longitudinally along the pad and a return electrode disposed on the reverse face thereof. A focussing section is utilized to provide varying depths of investigation by electrode current to preferably permit measurement of earth formation resistivity in the mudcake, flush zone, and uninvaded formation. In a preferred embodiment of the present invention, the conductive pad includes a pair of hingeably mounted sections which permit the apparatus to accommodate varying radii of curvature of boreholes.

9 Claims, 3 Drawing Sheets

LOGGING APPARATUS FOR MEASUREMENT OF EARTH FORMATION RESISTIVITY

This is a continuation of application Ser. No. 176,085 filed Apr. 1, 1988, now abandoned.

BACKGROUND OF THE INVENTION

1. Field of the Invention

This invention relates in general to resistive well logging devices and more particularly to resistive well logging devices which permit measurement of formation resistivity at multiple radial depths from the borehole.

2. Description of the Prior Art

In known drilling operations, the drilling fluid or "mud" in the borehole is conditioned such that the hydrostatic pressure of the mud column is greater than the fluid pressure of the formation. The differential pressure between the hydrostatic pressure of the mud column and the fluid pressure of the formation forces mud filtrate into the permeable formations which are traversed by the borehole, whereby solid particles of the drilling mud are deposited on the borehole wall to form a layer known as "mudcake". This mudcake usually has very low permeability and considerably reduces the rate of infiltration as the mudcake thickens. In the area of the formation which immediately surrounds the borehole all of the formation water and some of the hydrocarbons, if present, are flushed away by the mud filtrate. This area is referred to in the art as the "flushed zone". The resistivity of the so-called flushed zone is generally referred to as $R_{XO}$. Radially displaced even farther from the borehole is an area where the displacement of formation fluids is less and less complete, resulting in a transition zone in which a progressive change of resistivity occurs from the resistivity of the flushed zone to the resistivity of the uninvaded formation. The resistivity of the uninvaded formation is generally referred to as $R_t$. The lateral depth of invasion by mud filtrate depends in part on formation permeability and is quite variable, ranging from less than one centimeter to several tens of centimeters.

Measurements of the resistivity of the flushed zone are important for several reasons. In those formations where invasion is moderate to deep, knowledge of the flushed zone resistivity value makes possible more accurate determinations of the true resistivity of the formation, which can be utilized to determine the likelihood of hydrocarbon saturation. Also, some methods for computing hydrocarbons saturation are determined by utilizing a ratio of the resistivity of the flushed zone to the true formation resistivity. More recently, the resistivity of the flushed zone may be utilized in conjunction with a full evaluation of hydrocarbon effects on both neutron and density logs. Moreover, the comparison of the resistivity of the flushed zone and the true resistivity are useful for understanding the migration of hydrocarbons in the formation.

In addition to recognizing the usefulness of the resistivity of the flushed zone, the prior art has been concerned with acquiring information which is indicative .of the location of lateral discontinuities in electrical resistivities of the borehole surrounding materials in order to determine well borehole diameter and depth of fluid invasion. For example, U.S. Pat. No. 2,754,475 discloses that resistivity measurements may be made at various lateral depths in the borehole and formations surrounding the borehole by measuring throughout a plurality of borehole locations the average resistivity of formation and borehole fluid contained within respective spherical shells. These shells are established by an electrical field which converges substantially radially through surrounding formations upon an input electrode in the fluid within the well borehole. The borehole radius, depth of invasion, and the location of the uninvaded formation can be determined by identifying any discontinuities which appear in a display.

Still more recently it has been determined that a wall-engaging pad device is the most appropriate method for the measurement of shallow invasion. Many such devices have been proposed. U.S. Pat. No. 2,669,688 discloses a wall-engaging pad device which includes a three electrode system comprising a current electrode and two potential measuring electrodes, with the current return being located on the cable. Measurements made with this system are indicative of the resistivities at different shallow lateral depths of investigation. One depth of investigation is approximately equal to the probable thickness of mudcake on the wall of the borehole, and the other is slightly greater so as to include the mudcake and at least a portion of the adjacent portion of the formation that has been invaded by the mud filtrate. Since the presence of mudcake on the wall of a borehole is an indication of invasion of the formation by mud filtrate, proper interpretation of the measurement so made enables permeable formations to be identified. A third measurement at yet another shallow lateral depth of investigation also facilitates the identification of permeable formations.

In order to accurately measure the value of the resistivity of the flushed zone, the measurement must not be affected by the borehole or, in the alternative, must be capable of being corrected for borehole effects. Measurements made at different shallow lateral depths of investigation can be corrected when at least one of the measurements accurately yields mudcake resistivity. Borehole effects on the resistivity of the flushed zone measurement may be minimized by the utilization of focussing currents to accurately control the path taken by the survey current. Borehole effects, particularly severe as mudcake thickness increases, arise when the survey current is shunted back to the borehole by the relatively low resistance path formed by the mudcake, so that the formation measurement is influenced to a large extent by the mudcake resistivity. Several prior art devices have been proposed to overcome this problem. Generally, these types tools utilize a focussed pad or wall-engaging member to determine the lateral thickness of a mudcake as well as the resistivity of the invasion zone.

Wall-engaging pad devices have also found application in the determination of dip. Dip determining devices, known in the prior art as dip meters, typically employ four pads which are applied against the borehole wall at spaced locations. Typically, each pad includes a transducer which conducts an investigation of formation characteristics immediately adjacent to that pad. An individual pad may be provided with more than one electrode for the purpose of improving the detection of bed boundaries.

Dip meter tools typically use passively focussed electrode systems for constraining the surveying current to penetrate laterally for an appreciable distance into the adjacent earth formation. Typically, the focussing current electrode is a metallic surface which forms the major portion of the pad face. Centrally located in the pad face is a recess covered by a layer of insulating material. A survey current electrode is disposed in the recess and is separated from the metal pad proper by an insulating material. Survey current emitted from the survey electrode is caused to penetrate laterally into the adjacent earth formation by the focussing current emitted from the focussing electrode. Additional focussing current may be emitted from the conductive surface of the dip meter sonde body. Where more than one survey electrode is provided, the additional electrodes are also completely surrounded by the focussing electrodes such that the respective survey current beams are focussed as described above by current emitting from the focussing electrode. The current return is generally provided via a return electrode which is located on the lower end of a multi-conductor cable, on the cable bridle, or on a tool body member.

It should therefore be obvious that a need exists for an improved apparatus for measuring the resistivity of a subsurface formation traversed by a borehole to a series of lateral depths of investigation.

SUMMARY OF THE INVENTION

It is therefore one object of the present invention to provide an improved resistivity well logging device.

It is another object of the present invention to provide an improved resistivity well logging device which measures resistivity in earth formations to varying lateral depths of investigation.

It is yet another object of the present invention to provide an improved resistivity well logging device which accurately measures earth formation resistivity to selected radial depths of investigation and which is rugged and suitable for utilization in hostile environments.

The foregoing objects are achieved as is now described. The logging apparatus of the present invention includes an elongated sonde having an insulated section and an electrically isolated conductive pad mounted for lateral extension into contact with a borehole wall. The electrically conductive pad includes a plurality of isolated current electrodes which are disposed longitudinally along a line within the pad and a return electrode which is located on the reverse face of the pad. A focussing section of the pad face is utilized to provide varying depths of investigation by electrode current to preferably permit measurement of earth formation resistivity within the mudcake, the flushed zone and the uninvaded formation. Accurate measurement of the current through each current electrode may then be utilized to provide an indication of formation resistivity at various depths. In a preferred embodiment of the present invention, the conductive pad includes a pair of hingeably mounted sections which permits the pad to accommodate varying radii of curvature of boreholes.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
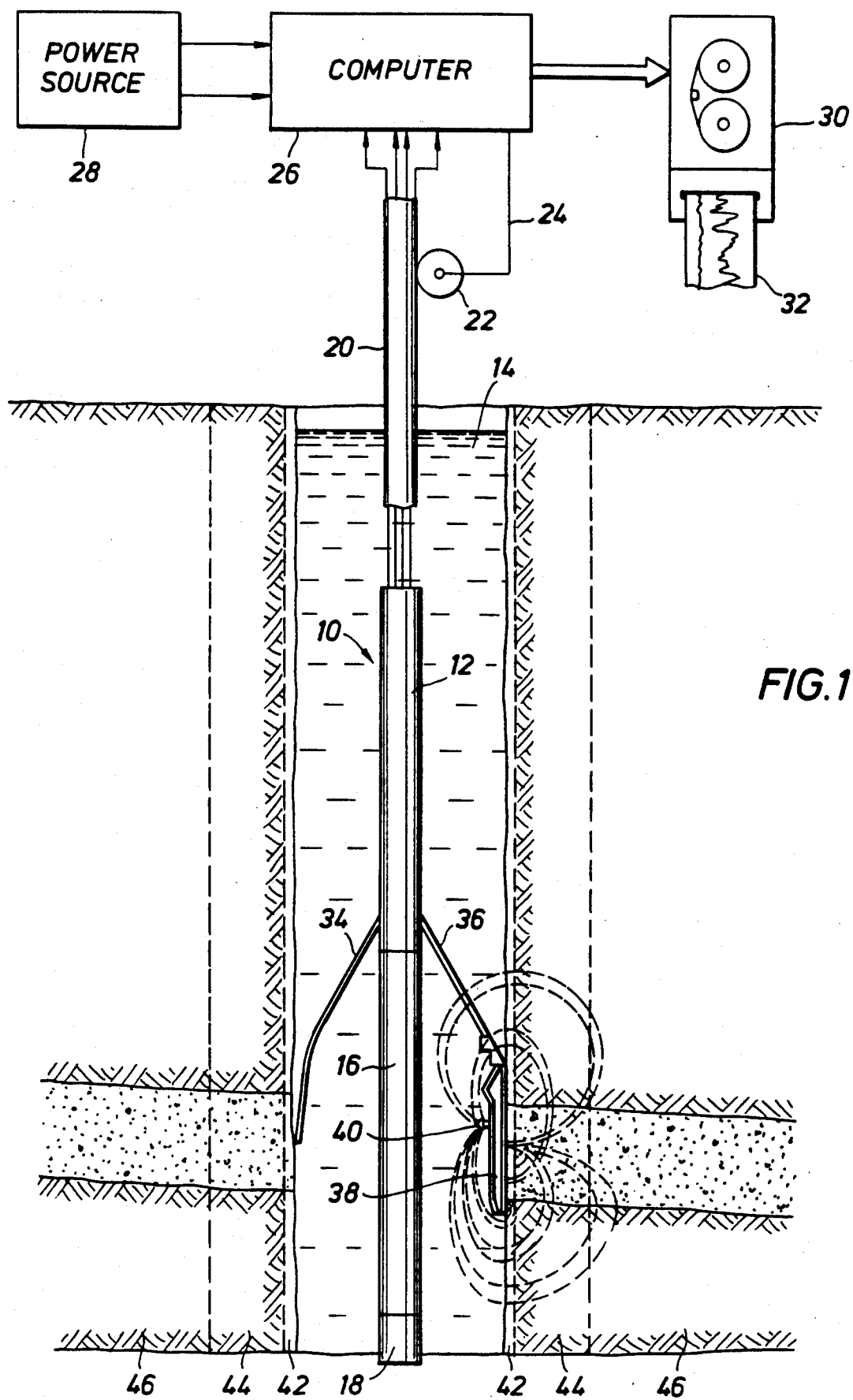
FIG. 1 is a pictorial representation of a borehole logging tool in accordance with the present invention wherein the earth formation traversed by the borehole is illustrated in cross section and the surface equipment is illustrated schematically.

With reference now to the figures and in particular with reference to FIG. 1, there is depicted a pictorial representation of a borehole logging tool in accordance with the present invention. As can be seen, logging apparatus 10 includes a sonde 12 which is suspended in a borehole 14. Sonde 12 includes an insulated section 16 and a reference electrode is which are utilized in a manner which will be explained herein.

Sonde 12 is preferably suspended in borehole 14 by means of multi-conductor logging cable 20 which is utilized to couple the output of logging apparatus 10 to computer 26. Computer 26 is coupled to power source 28 which is utilized to provide electrical power to logging apparatus 10 by means of logging cable 20 in a manner well known in the art. In the depicted embodiment of the present invention, a winch 22 is utilized in conjunction with logging cable 20 to raise and lower logging apparatus 10 into and out of borehole 14. Winch 22 preferably provides a depth signal On line 24 to computer 26 to provide depth correlation for a log plot. Computer 26 is utilized to provide the necessary computations to provide a corrected log signal which is then coupled to recorder 30. In the preferred embodiment of the depicted invention, recorder 30 preferably produces a well log 32 which depicts a graphic representation of the formation resistivity at various lateral depths from borehole 14.

As can be seen, the strata around borehole 14 may be divided into three separate areas. Firstly, a layer of "mudcake" 42 is typically deposited on the wall of borehole 14. Mudcake 42 generally has a low permeability and substantially reduces the rate of infiltration by drilling fluids into the formation. Next, "flushed zone" 44 is that area of the formation which immediately surrounds borehole 14 wherein all of the formation water and some of the hydrocarbons, if present, are flushed away by the mud filtrate. The resistivity of flushed zone 44 is generally referred to as $R_{XO}$. Radially displaced even farther from borehole 14 is an area of "uninvaded" formation 46 where mud filtrate has not reached and displacement of formation fluids has not occurred. The resistivity of uninvaded formation 46 is generally referred to as $R_t$.

Referring again to logging apparatus 10, it can be seen that sonde 12 serves to support insulating arm 36 to which wall-engaging member 38 is connected. Backup arm 34 preferably cooperates with insulating arm 36 to ensure that wall-engaging member 38 remains in constant contact with the wall of borehole 14. As will be explained in greater detail herein, wall-engaging member 38 includes a plurality of electrodes which act to inject current into mudcake 42, flushed zone 44 and uninvaded formation 46. Return electrode 40 is preferably disposed on the rear face of wall-engaging member 38 and serves a single return sink for the current injected into the formation as discussed above.

Figure 2:
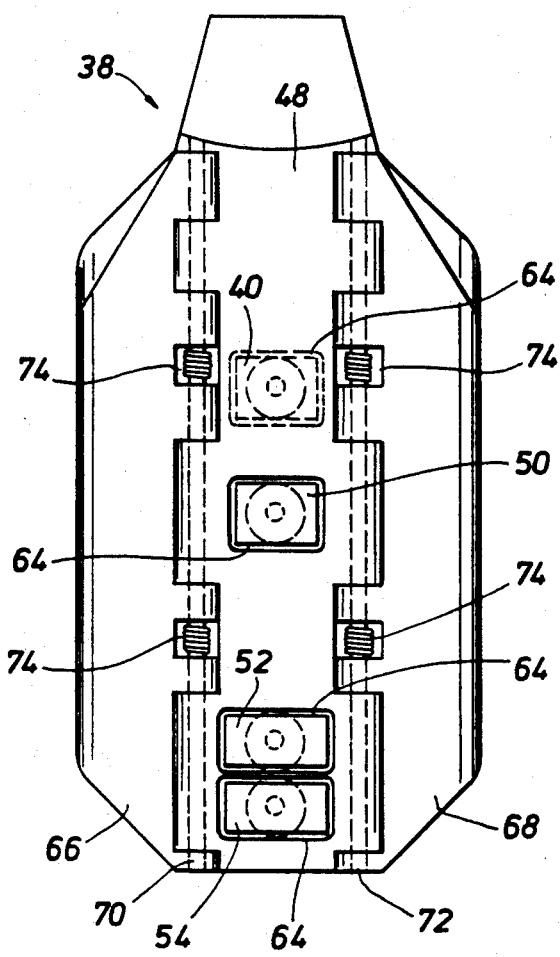
FIG. 2 is a plan view of the face of one embodiment of the wall-engaging pad of the present invention.

Referring now to FIG. 2, there is depicted a plan view of the face of one embodiment of wall-engaging member 38 of the present invention. In a preferred embodiment of the present invention, wall-engaging member 38 is constructed of a conductive material, such as soft steel, which demonstrates high magnetic permeability in order to magnetically shield the electronics circuitry of logging apparatus 10. In an alternate embodiment of the present invention, wall-engaging member 38 may be constructed of a stainless steel alloy which is ferromagnetic in nature so that adequate shielding may be provided while simultaneously providing corrosion and wear resistance.

In order to permit wall-engaging member 38 to mate with borehole walls in boreholes of varying diameters, it is necessary to provide a degree of flexibility in the design of wall-engaging member 38. This is accomplished in the depicted embodiment of the present invention by the provision of two pivoting wing sections 66 and 68 which are mounted to the main body of wall-engaging member 38 by means of hinge pins 70 and 72. Additionally, bias springs 74 are preferably utilized to urge pivoting wing sections 66 and 68 forward into contact with the borehole wall.

The primary wall-engaging face of wall-engaging member 38 includes focussing section 48. Disposed within focussing section 48 are a plurality of electrodes which are utilized to measure the resistivity of the formations surrounding borehole 14 at various lateral depths, as indicated in FIG. 1. As can be seen, deep current electrode 50 is preferably disposed within the middle of focussing section 48. As a result of this placement, current from deep current electrode 50 is "focussed" deeper into the formation as a result of the potential of focussing section 48 being equal to the potential of deep current electrode 50. Shallow current electrode 54 is preferably disposed at one edge of focussing section 48 and is therefore not subject to the great focussing effect which is present in the vicinity of deep current electrode 50. Disposed at an intermediate location between deep current electrode 50 and shallow current electrode 54 is medium current electrode 52. The location of medium current electrode 52 is such that the focussing effect of focussing section 48 is intermediate in its effect on the depth of penetration of the current from medium current electrode 52 into the formation.

Also depicted in FIG. 2, is the location of return electrode 40. The Applicants' have discovered that the placement of return electrode 40 on the rear face of or behind wall-engaging member 38 rather than on a bridle or at a location on sonde 12 will result in a vastly improved resistivity measurement. However, the rear face of pivoting wing sections 66 and 68 must be insulated in order to limit the direct leakage of current between current electrodes 50, 52, and 54 and return electrode 40. As detailed above, insulated arm 36 is also insulated to minimize such leakage current, or, in the alternative, to constrain the leakage current to the borehole fluids. A final consideration in the insulation of the various components of wall-engaging member 38 is the isolation of the various current electrodes from the focussing section to ensure that the individual currents flowing through the various electrodes may be accurately measured. Thus, an insulating material 64 is provided to insulate each electrode from the surface of wall-engaging member 38. Preferably insulating material 64 is provided flush with the face of wall-engaging member 38 to ensure that a minimum amount of erosion will take place and that stray current from each electrode will not span the gap between an electrode and the face of wall-engaging member 38.

Figure 3:
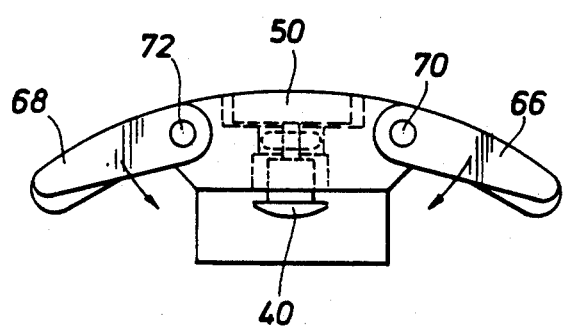
FIG. 3 is a top view of one embodiment of the wall-engaging pad of the present invention.

With reference now to FIG. 3, there is depicted a top view of wall-engaging member 38. The curvature of wall-engaging member 38 may be seen, as well as the pivoting nature of pivoting wing sections 66 and 68. In this manner, wall-engaging member 38 may accommodate boreholes of widely varying diameters and still retain contact between the measurement electrodes and the surface of the borehole wall.

Figure 4:
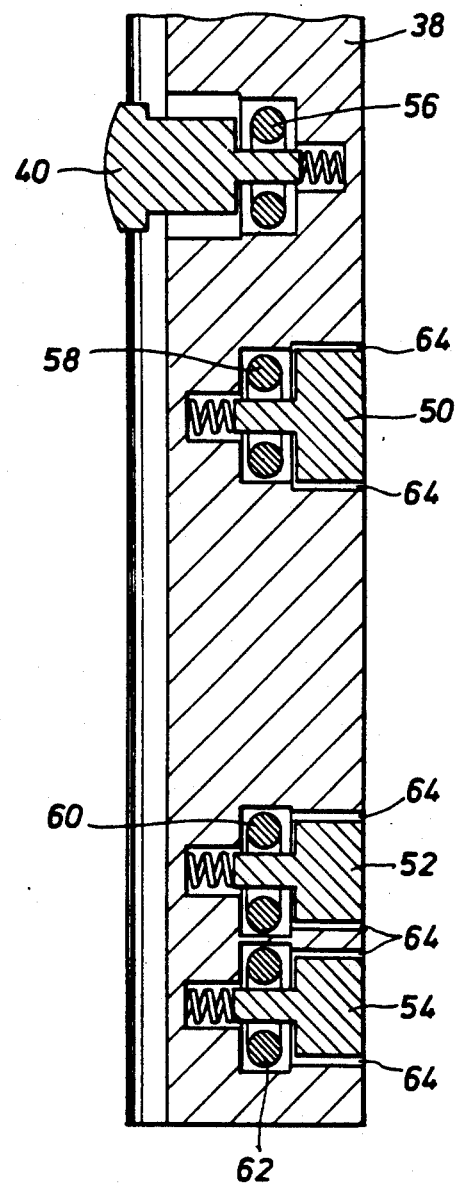
FIG. 4 is a partial sectional view of one embodiment of the wall-engaging pad of the present invention.

Referring now to FIG. 4, there is depicted a partial sectional view of wall-engaging member 38 which may be utilized to demonstrate some of the construction techniques utilized in the construction thereof. As can be seen, each electrode is preferably machined from solid steel and has a generally rectangular shape. Each electrode is then fitted into a cup-like insulator 64 which is preferably constructed of a plastic insulating material. The electrode, insulating cup, and measurement toroid are then threaded or otherwise mounted into the body of wall-engaging member 38. The radius of curvature of the wall-engaging face of wall-engaging member 38 is then machined as a unit to achieve the desired curvature while ensuring that all surfaces remain flush.

The operation of logging apparatus 10 is substantially dependent upon maintaining the entire wall-engaging face of wall-engaging member 38 at an equal potential. Therefore, the circuitry utilized to measure the current through each electrode must be kept to a minimum resistance in order to reduce variations in potential at each electrode. Modeling has demonstrated that this resistance should be kept at a value less than or equal to 0.015 ohms. The achieving of such a low resistance is only possible by placing a high turn ratio transformer within the body of wall-engaging pad 38. As discussed above, in the depicted embodiment of the present invention, a plurality of toroidal transformers are utilized for this requirement. As can be seen, toroidal transformers 58, 60, and 62 are utilized to measure the current through deep, medium, and shallow current electrodes 50, 52, and 54 respectively. The generation of current so that resistivity may be measured is accomplished by utilizing driving toroid 56 to drive the potential of return electrode 40 to a point below the potential of electrodes 50, 52, and 54 and the potential of focussing section 48, causing current to flow into the formation from focussing section 48 and from each measurement electrode to return electrode 40.

Figure 5:
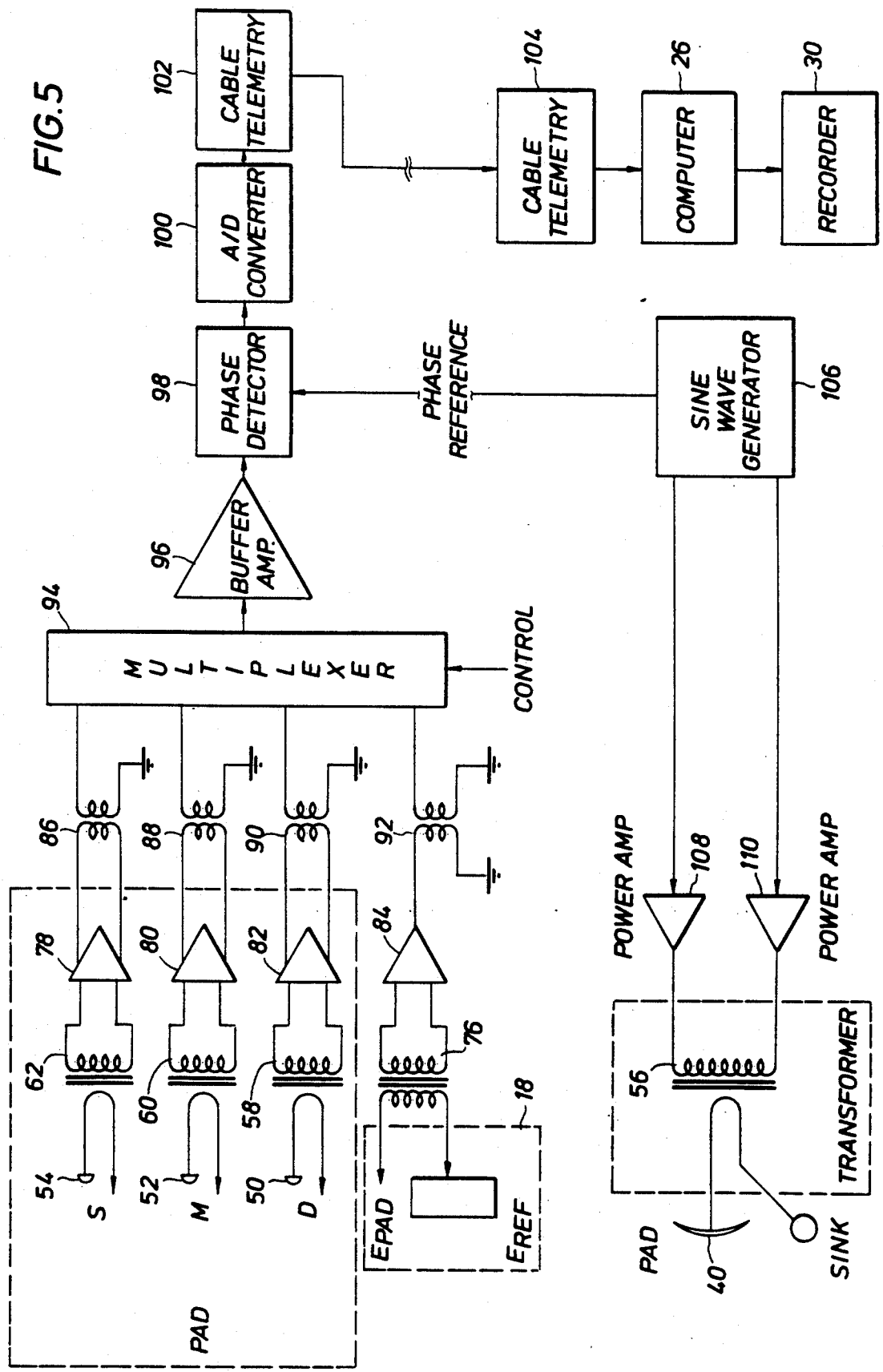
FIG. 5 is a schematic representation of the electronics of the borehole logging tool of the present invention.

With reference now to FIG. 5, there is depicted a schematic representation of the electronics of borehole logging apparatus 10 of the present invention. As can be seen, sine wave generator 106 is preferably utilized to generate a high frequency Sine wave which is coupled via tandem power amplifiers 108 and 110 to driving toroid 56, in order to drive the potential of return electrode 40 to a level below the potential of focussing section 48 and current electrodes 50, 52, and 54.

The current through deep current electrode 50, medium current electrode 52, and shallow current electrode 54 is measured, as discussed above, by utilizing toroidal transformers 58, 60, and 62 and the secondaries of each of these toroidal transformers is coupled to a respective current-to-voltage amplifier 78, 80, and 82. In one embodiment of the present invention, current-to-voltage amplifiers 78, 80, and 82 are preferably mounted within the body of wall-engaging member 38; however, this is not a necessary factor in the design and construction of logging apparatus 10. The voltage at each measurement electrode is measured with respect to reference electrode 18. The voltage at reference electrode 18 is in phase with current through wall-engaging member 38 and is coupled utilizing transformer 76. The secondary of transformer 76 is then coupled to amplifier 84. The outputs of current to voltage amplifiers 78, 80, and 82 as well as the output of reference amplifier 84 are coupled via transformers 86, 88, 90, and 92 to multiplexer 94.

Multiplexer 94 preferably includes circuitry which is utilized to measure the difference in voltages generated by the currents measured at each electrode from the voltage generated by the current at the reference electrode. The output of multiplexer 94 is then preferably buffered and amplified by buffer amplifier 96 and coupled to phase detector 98. Phase detector 98 receives a phase reference signal from sine wave generator 106 to assure proper measurement. The output of phase detector 98 is then coupled through analog to digital converter 100 for conversion into an appropriate digital signal. The resultant digital signal is then transmitted via cable telemetry transmitter 102 and after transmission through logging cable 20 is received at cable telemetry receiver 104. The digital signal thus transmitted up logging cable 20 is then coupled to computer 26 for processing in accordance with techniques well known to those skilled in this art.

As a result of the techniques disclosed herein, logging apparatus 10 (see FIG. 1) can generate apparent resistivity measurements corresponding to three separate depths of investigation. The medium and shallow depth measurements may be combined to provide an indication of formation permeability due to the presence or absence of mudcake and various ratios of the shallow, medium and deep apparent resistivity measurements may be utilized to correct the deep measurement to obtain true $R_{xo}$ or to determine the thickness of mudcake 42 (see FIG. 1). Each of the resultant logs may then be recorded on recorder 30 for future reference.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A shoe for obtaining electrical conductivity measurements of formations traversed by a well borehole, the shoe being supported on a logging apparatus, and comprising:
   (a) a wall engaging face on said shoe made of a conductive material having a focusing section;
   (b) first, second and third aligned electrodes for emitting focused current into formations adjacent to a well borehole, said electrodes aligned and displayed along the length of said face;
   (c) an exposed rear face spaced behind said wall engaging face on said shoe opposite said focusing section wherein said rear face is formed of an insulative material;
   (d) a return conductive electrode disposed behind said conductive wall engaging face, said rear electrode being surrounded by said insulative rear face wherein said return electrode is centrally located with respect to said shoe; and
   (e) current measuring means connected with said electrodes for measuring focused current directed from said focusing section for determining formation related resistivity.

2. The apparatus of claim 1 for providing signals indicative of the electrical resistivity of a subsurface formation transversed by a borehole further including means disposed from a sonde for urging said wall-engaging face against a borehole wall.

3. The apparatus of claim 1 for providing signals indicative of the electrical resistivity of a subsurface formation traversed by a borehole wherein said wall engaging face comprises a steel pad having a high magnetic permeability.

4. The apparatus of claim 1 for providing signals indicative of the electrical resistivity of a subsurface formation traversed by a borehole wherein said three aligned electrodes are vertically aligned and each thereof is surrounded by a resiliently mounted current measuring electrode.

5. The apparatus of claim 4 for providing signals indicative of the electrical resistivity of a subsurface formation traversed by a borehole according wherein each of said three electrodes is individually urged toward wall engagement by individual resilient means.

6. The apparatus of claim 5 wherein said resilient means comprises coil springs bearing against said electrodes and said current measuring means is a toroid around each of said electrodes.

7. A wall engaging member adapted for support on a logging apparatus to form signals indicative of electrical conductivity in a formation adjacent to a well borehole, comprising:
   (a) a conductive wall-engaging face made of conductive material having a focussing section;
   (b) a first current electrode disposed proximate to one end of said focussing section;
   (c) a second current electrode disposed proximate to the center of said focussing section;
   (d) a third current electrode disposed between said first and second electrodes;
   (e) an exposed insulative rear wall opposite said face of focussing section;
   (f) a return electrode disposed behind said conductive wall-engaging face said electrode being surrounded by said exposed insulative rear wall wherein said electrode is centered and is vertically disposed in the middle portions of said wall engaging member;
   (g) current measuring means connected to said electrodes for measuring current flow for use in determining formation related resistivity wherein said current measuring means includes a toroid around each of said electrodes;
   (h) current measurement responsive means connected to said current measurement means to form a current flow dependent indication of formation resistivity;
   (i) compressible resilient means urging said electrodes into contact with the wall of a borehole; and (j) individual compressed coil springs urging each of said electrodes to wall engagement.

8. The apparatus of claim 7 for providing signals indicative of the electrical resistivity of a subsurface formation traversed by a borehole according wherein said wall-engaging member comprises a steel pad having a high magnetic permeability.

9. The apparatus of claim 8 wherein coil springs act comprise said resilient means and against said electrodes and said current measuring means is a toroid around each of said electrodes.

* * * * *